United States Patent
Alaska

[11] 3,810,698
[45] May 14, 1974

[54] ANALYZER FOR SIMULTANEOUSLY DETERMINING THE RX, PHOTOCHROMIC, AND HARDENING CHARACTERISTICS OF LENSES

[76] Inventor: St. Barth Alaska, 1530 Chickasaw Dr. Indian Hills, Maperville, Ill. 60540

[22] Filed: June 16, 1972

[21] Appl. No.: 254,951

[52] U.S. Cl............... 356/124, 356/114, 356/239, 350/160 P, 356/204
[51] Int. Cl. ............................................ G01b 9/00
[58] Field of Search .......... 356/124, 114, 239, 204, 356/119; 350/195, 160 P

[56] References Cited
UNITED STATES PATENTS

| | | | |
|---|---|---|---|
| 1,873,526 | 8/1932 | Allen | 356/127 |
| 3,208,860 | 9/1965 | Armistead et al. | 350/160 P X |
| 3,540,793 | 11/1970 | Araujo et al. | 350/160 P X |
| 3,400,972 | 9/1968 | McIntyre et al. | 350/160 P UX |
| 3,440,621 | 4/1969 | Knapp | 350/160 P UX |
| 3,625,593 | 12/1971 | Taylor | 356/114 X |
| 3,656,854 | 4/1972 | Bricker | 356/119 |

Primary Examiner—Ronald L. Wibert
Assistant Examiner—Paul K. Godwin
Attorney, Agent, or Firm—Sherman Levy

[57] ABSTRACT

Instruments have been known which will determine the prism, cylinder power, and spherical power of an ophtholmic lens. My invention improves the existing optical instruments, in that my optical instrument has the additional advantages of analyzing the ionic properties of a chemically treated lens by the use of a prism, which disperses light into its spectral colors, and simultaneously polarizes light. The polarized light determines if lenses have a maltese pattern as shown for heat treated and air cooled hardened lenses. Another advantage of my instrument is it can determine by the use of Black lite, the chemical features of a lens to activate silver halide crystals and thus differentiate this type of lens photochromic lenses composition, from the conventional lenses which are made of ordinary ophtholmic glass or plastic. In chemically treated lenses to make them hard, the spectral polarized images will change hue and saturation when the chemically treated lens is moved before the face of the polarized prism.

2 Claims, 3 Drawing Figures

ANALYZER FOR SIMULTANEOUSLY DETERMINING THE RX, PHOTOCHROMIC, AND HARDENING CHARACTERISTICS OF LENSES

SUMMARY OF THE INVENTION

This invention is seen as an improvement to an optical instrument that is used to measure and analyze the prism power, cylinder power, and spherical power of lenses. The improvement allows the operator of the instrument to simultaneously determine whether or not the lens is photochromic and also to determine if the lens is a heat treated and air cooled hardened lens, or if the lens is a chemically treated hardened lens.

Figures 1, 2, 3:
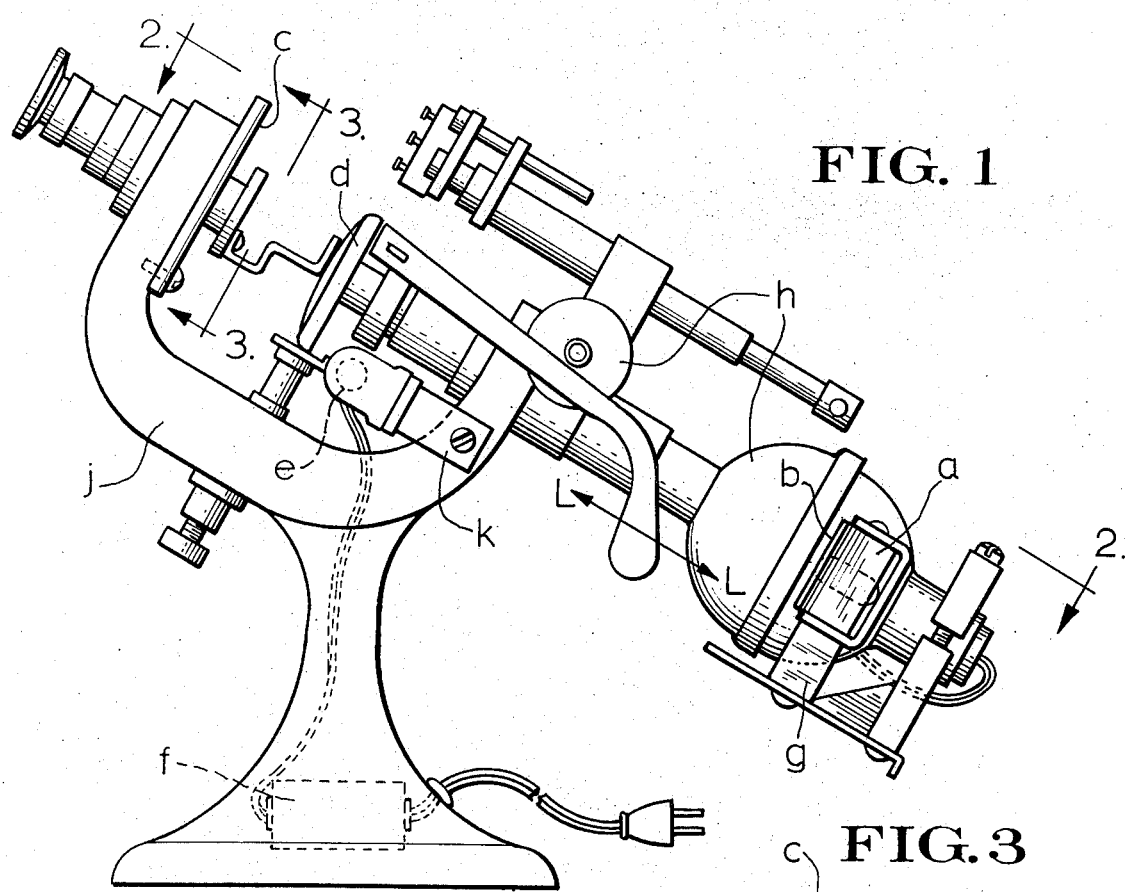
FIG. 1. is an elevational view of the improved analyzer.
FIG. 2. is a plan view of the improved analyzer.
FIG. 3. is a sectional view of the improved analyzer showing polarizing filter used for the analyzer.

DESCRIPTION OF THE PREFERRED EMBODIMENT OF THE INVENTION a. shows prisms positioned to reflect light emitted from the incandescent light source towards the lens which is being tested shown in FIG. 1. and in FIG. 2.

b. shows polarizing filters, on the light exiting face of each prism.

c. Shows the polarizing analyzer filter which has its direction of polarization opposed 90° to that of said polarizers on the face of each prism. Said analyzer filter (c) is positioned at the observing end of the instrument and in the path of light exiting said prisms (a) and polarizers (b), to effect a minimum light transmitting through said analyzer filter (c) before a lens to be tested is placed therebetween.

d. shows position of eyeglass lens to be tested in FIG. 1 and FIG. 2.

e. shows position an ultraviolet light source to effect darkening of lenses which have photochromic properties in FIG. 1 and FIG. 2.

f. shows ultraviolet light ballast within the base of instrument.

g. shows bracket which holds the polaroid prisms. The single incandescent light source shown provides illumination for measuring the prism, cylinder and spherical power of an eyeglass lens properly positioned along the optical axis between the telescoping part and the eyepiece. The single incandescent light source also provides the light as indicated by the broken lines with arrows shown in FIG. 2. The light is transmitted through openings in the lamp house, is reflected by the prisms (a), polarized by filters (b), and is transmitted to said analyzer filter (c). When a lens of the eyeglass to be tested is positioned to be traverse to one of the polarized light beams, indicated by said broken lines in FIG. 2, it is possible to detect whether the lens has been heat treated and air cooled hardened or chemically hardened. If the lens has been hardened by heat treating and air cooling an image of a Maltese cross will be viewed through the analyzer. However, if the lens has been chemically hardened the lens will appear through the analyzer filter to have density variations.

With the present invention, it will be seen that a further optic analyzer has been provided with attachments or accessories that make possible the analyzing of a pair of eye glasses or the like. The basic instrument with the attachments makes it possible to simultaneously perform various tests so that it can be determined if a lens is photochromic, and if a lens has been heat treated and air cooled hardened or chemically hardened. Further, the present invention provides a means of determining spherical, cylindrical, axis power, and bifocal power as well as the prism power of the lens while simultaneously determining the photochromic and hardening properties.

The ultraviolet light is arranged as shown in the drawings and is indicated by the letter (e) in FIG. 2 to effect a density change in lenses which are photochromic.

I claim:

1. In an instrument for measuring and analyzing the prism power, cylinder power, and spherical power of a sample lens, which includes a support means, an incandescent light source mounted on said support means providing a first portion of light along a first axis, a telescopic portion mounted on said support means and positioned along said first axis receiving said first portion of light from said incandescent light source, a sample lens movably positioned to a first position along said first axis, an eyepiece mounted on said support means and positioned along said first axis to receive light transmitted successively through said telescopic portion and said sample lens to allow determination of the prism power, cylindrical power and spherical power of said sample lens; the improvement comprising: a prism mounted on said support means, to receive a second portion of light from said incandescent light source; a polarizing filter having its direction of polarization in a first direction mounted on the light exiting face of said prism; a polarizing analyzer filter having its direction of polarization in a second direction which is crossed 90° with respect to that of said polarizing filter, and mounted on said support means to receive light transmitted through said polarizing filter along a second axis approximately parallel to said first axis; said sample lens movably positioned to a second position along said second axis whereby determination can be observed through said polarizing analyzer filter if said sample lens has the characteristic of being heat treated and air cooled hardened or chemically hardened; an ultraviolet light source mounted on said support means so as to radiate said sample lens in either said first or said second position to effect a change in observable density if said sample lens has photochromic characteristics.

2. The invention of claim 1, wherein said sample lens comprises a pair of eyeglasses with two lenses, whereby one of said two lenses is in said first position and the other of said two lenses is in said second position, to provide simultaneous testing of the prism power, cylindrical power, spherical power, and photochromic characteristics of one of said two lenses, while determining said hardening and photochromic characteristics of the other of said two lenses.

* * * * *